United States Patent [19]
Otomo

[11] Patent Number: 5,825,531
[45] Date of Patent: Oct. 20, 1998

[54] ELECTRICAL MOVING APPARATUS FOR MICROSCOPE

[75] Inventor: Masahiko Otomo, Fujisawa, Japan

[73] Assignee: Nikon Corporation, Tokyo, Japan

[21] Appl. No.: 569,394

[22] Filed: Dec. 8, 1995

[30] Foreign Application Priority Data

| Dec. 14, 1994 | [JP] | Japan | 6-310577 |
| Dec. 14, 1994 | [JP] | Japan | 6-310578 |
| Dec. 14, 1994 | [JP] | Japan | 6-310579 |
| Dec. 14, 1994 | [JP] | Japan | 6-310580 |

[51] Int. Cl.⁶ .......................... G02B 21/00; G02B 21/26
[52] U.S. Cl. ................................ 359/368; 359/391
[58] Field of Search .................. 359/391, 392, 359/368; 250/201.3

[56] References Cited

U.S. PATENT DOCUMENTS

| 4,012,634 | 3/1977 | Bouton et al. | 250/201.3 |
| 4,639,587 | 1/1987 | Chadwick et al. | 250/201.3 |
| 4,653,878 | 3/1987 | Nakasato et al. | 359/381 |
| 4,725,720 | 2/1988 | Sawada et al. | 250/201.3 |
| 4,930,882 | 6/1990 | Koch et al. | 359/392 |
| 5,260,825 | 11/1993 | Nagano et a. | 359/368 |
| 5,557,456 | 9/1996 | Garner et al. | 359/393 |

FOREIGN PATENT DOCUMENTS

| WO92/04666 | 3/1992 | WIPO . |
| WO94/07172 | 3/1994 | WIPO . |

*Primary Examiner*—Thong Nguyen
*Assistant Examiner*—Mark A. Robinson
*Attorney, Agent, or Firm*—Shapiro and Shapiro

[57] ABSTRACT

An electrically-driven moving apparatus for a microscope includes a control device for rotating and stopping an electric motor on the basis of outputs of a detector for detecting a rotational quantity of an operation handle and of a detector for detecting a position changing quantity of a stage. There may be provided a speed control device for changing over the stage to extremely slow fixed speed control when using an objective lens having a high magnification. The stage may be moved at a relatively high speed in response to an operation of a rotary handle for a rough movement and moved at a relatively slow speed in response to an operation of a rotary handle for a micro movement. A braking device is provided on the rotary handle, and reaching of the stage to a movement limit position can be also sensed by the operator.

13 Claims, 13 Drawing Sheets

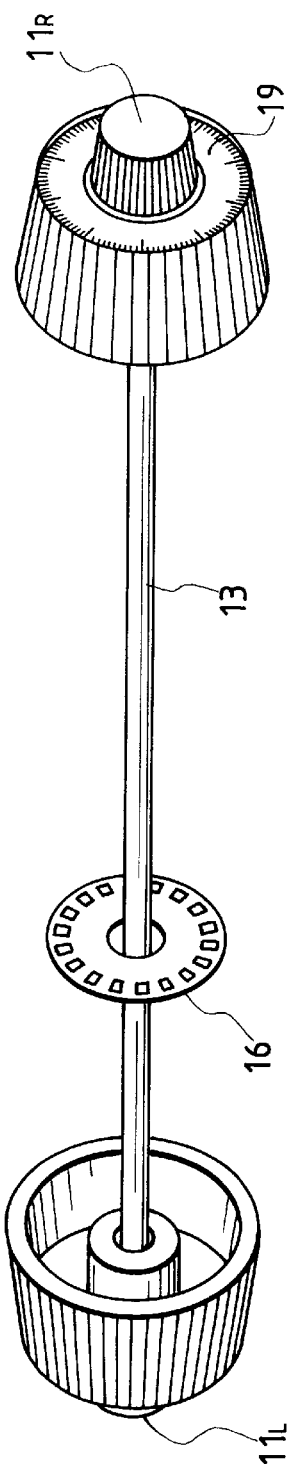
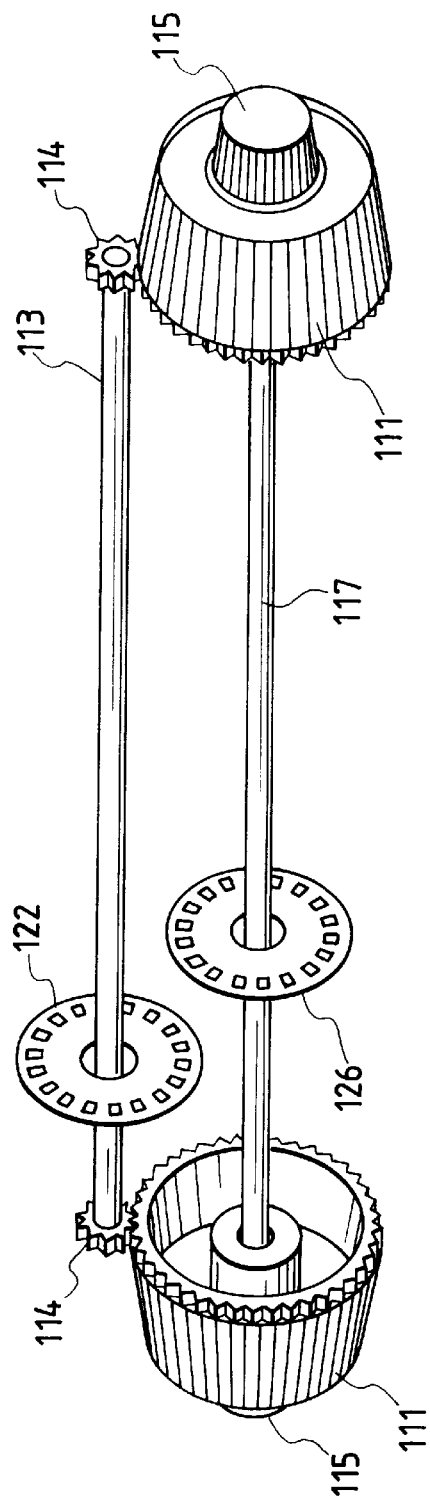

ELECTRICAL MOVING APPARATUS FOR MICROSCOPE

BACKGROUND OF THE INVENTION

1. Field of the Invention

The present invention relates generally to an electrical moving apparatus for a microscope and, more particularly, to a moving apparatus for moving a movable member such as a lens barrel and a stage of a microscope.

b 2. Related Background Art

In recent microscopes, there has been a tendency that a stage increases in size with diversification of objects to be examined, and, in the majority of cases, there is adopted a stage moved by an electric motor.

A conventional known electrical moving apparatus uses two push switches, i.e., an up-switch and a down-switch. A pinion engaging with a rack formed in the stage is driven by the electric motor. A rotating direction of the electric motor is controlled so that the stage is raised by pushing the up-switch but lowered by pushing the down-switch.

Known also is a control apparatus capable of changing a moving speed of the stage on the basis of operating the up- and down-switches by providing a changeover switch for selecting a speed in addition those two push switches.

Known further is an apparatus for moving the stage up and down with the aid of the electric motor in response to an operation of an operation unit of a rotary handle type. This type of apparatus is normally provided with a changeover switch for changing over a corresponding relationship between a rotational quantity of the rotary handle and a moving quantity of the stage, thereby making it possible to change over the rough and micro movements of the stage to each other.

On the other hand, in a conventionally manual type stage moving control apparatus, the rough and micro movement operation of the stage are performed by individually operating an operation dial functioning as a rough movement handle and an operation handle functioning as a micro movement handle in the majority of cases. Accordingly, there are a rough movement handle constructed to move the stage by, e.g., 5 mm with one rotation thereof and a micro movement handle constructed to move the stage by 0.1 mm with one rotation thereof. The micro movement handle has a scale formed by equally dividing 360 degrees by 100, wherein a 1 μm movement corresponding to one graduation can be read.

In the normal manual type moving control apparatus, the rotations of the operation dial are mechanically decelerated through a speed reduction device such as a rack-and-pinion and a speed reduction gear, and therefore an up-and-down movable member can be moved at a velocity corresponding to a rotating speed of the operation dial. Additionally, a stage moving quantity corresponding exactly to the rotational quantity of the operation dial is secured.

Thus, the conventional electrical moving apparatus for moving the stage by operating the switches including the up- and down-switches is completely different from the manual moving apparatus in terms of the operating method thereof and is, as the case may be, hard to move the stage to a position as the operator desires until the operator gets accustomed to the moving operation. Further, there are many cases wherein it is difficult to intuitively recognize a relation between the operating quantity and the moving quantity and to make a micro adjustment of the stage position.

Further, in the electrical moving apparatus operated by the rotary handle, the rotational quantity of the handle and the moving quantity of the stage do not accurately correspond to each other, and, hence, the operator needs to get accustomed to move the stage as the operator wishes.

SUMMARY OF THE INVENTION

It is a primary object of the present invention to provide an electrical moving apparatus for a microscope that is capable of operating with the same sense as a typical manual moving apparatus without the need for the operator to become accustomed to use of the apparatus.

A moving apparatus according to the present invention includes a comparator for comparing an output of a detector for detecting a rotational quantity of at least one rotary handle with an output of a detector for detecting a position changing quantity of a microscope movable member such as a stage and a lens barrel and outputting a difference signal therebetween. Then, the difference signal from this comparator is used for feedback control by a control device for rotating and stopping an electric motor.

In a preferred embodiment of the present invention, the detector for detecting a change in position of the stage serving as a movable member is constructed of a rotary encoder for detecting an angle of rotation of a rotary shaft rotating integrally with the electric motor. Further, the detector for detecting the rotational quantity of the rotary handle is preferably constructed of a rotary encoder. With this construction, outputs of the two detectors can be used as pulse signals, and an easy and accurate comparison based on counting pulses can be performed.

It is another object of the present invention to provide an electrical moving apparatus equipped with a speed control device capable of obtaining an operating sense approximate to that of a manual type moving apparatus during an observation by use of a normal objective lens and changing over the microscope movable member such as the stage and the lens barrel to extremely slow fixed speed control when using a high-magnification objective lens.

It is still another object of the present invention to provide an electrical moving apparatus equipped with a rotary handle for a rough movement and a rotary handle for a micro movement and capable of moving the microscope movable member such as the stage and the lens barrel at a comparatively high speed in response to an operation of the rough movement rotary handle and moving the movable member at a comparatively slow speed in response to an operation of the micro movement rotary handle.

It is a further object of the present invention to provide an electrical moving apparatus capable of recognizing reaching of the microscope movable member to a movement limit position with the same sense as a manual type moving apparatus by providing the rotary handle with a braking device.

BRIEF DESCRIPTION OF THE DRAWINGS

FIG. 2 is a perspective view illustrating a structure of an operation handle;

FIG. 5 is a perspective view illustrating a structure of the operation handle in a third embodiment of the present invention;

DESCRIPTION OF THE PREFERRED EMBODIMENTS

Figure 1:
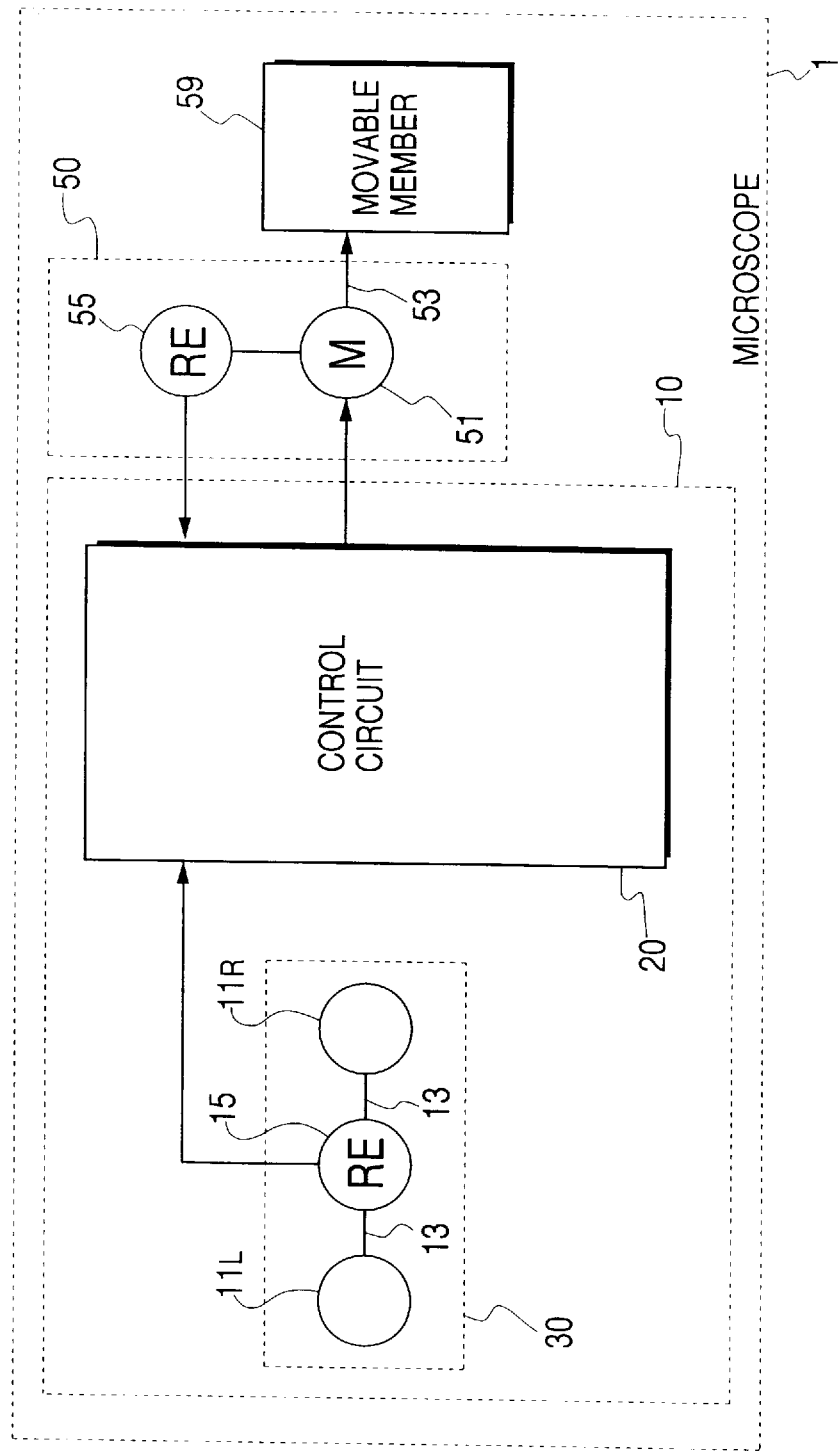
FIG. 1 is a block diagram schematically showing a construction of a microscope in a first embodiment of the present invention.

As illustrated in FIG. 1, a microscope 1 in a first embodiment of the present invention includes a movable member 59, a moving unit 50 and an operation unit 10. The movable member 59 is a member movable in up-and-down directions with respect to a base of the microscope. The movable member 59 corresponds to a stage mounted with a specimen in the case of the microscope of such a type that focusing is performed by moving the stage up and down. Movable member 59 could also be a lens barrel incorporating an optical system containing an object lens in the case of the microscope of such a type that the focusing is effected by moving the object lens up and down. The moving unit 50 includes a DC motor 51 for moving the movable member through a power transmission mechanism 53 inclusive of a speed reducer. The moving unit 50 also includes a position detector 55 which has a rotary encoder equipped with an encoder disc rotated with rotations of the DC motor 51 and generates an output for indicating a position of the movable member 59. Then, the operation unit 10 has a manual input device 30 equipped with operation handles 11L, 11R and a detector 15 for detecting an angle of rotation of the handle. The operation unit 10 also has a control circuit 20 for controlling a drive of the DC motor 51 under feedback control based on an output from the position detector 55 as well as on an output from the angle-of-rotation detector 15.

A specific configuration of the manual input device 30 is illustrated in, e.g., FIG. 2. That is, dial-type operation handles 11L, 11R are provided at both ends of a rotary shaft 13. A handle mounting portion 19 is formed with a scale formed by equally dividing 360 degrees by 100. Fixed to the rotary shaft 13 rotating together with the handle is a disc 16 of the rotary encoder constituting the angle-of-rotation detector 15 in combination with an unillustrated photocoupler. Accordingly, a quantity of rotation of the handle is detected by the angle-of-rotation detector 15 and outputted in the form of a pulse signal.

Figure 3:
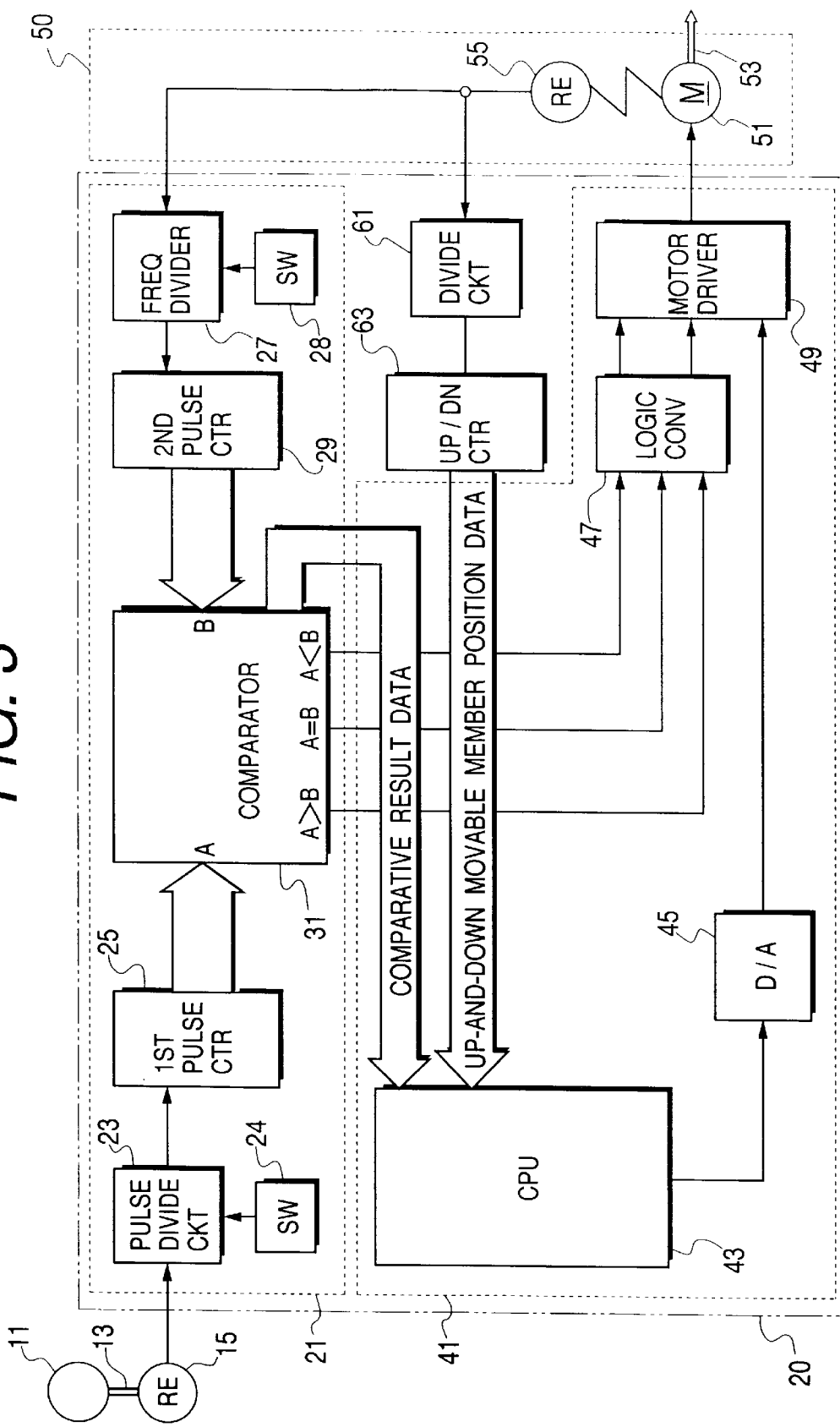
FIG. 3 is a block diagram illustrating a configuration of a control circuit of FIG. 1.

Then, the control circuit 20 inputting the output from the angle-of-rotation detector 15 is, as illustrated in FIG. 3, constructed of a comparing circuit 21 and a motor control circuit 41. The comparing circuit 21 includes two pulse counters 25, 29, a pulse dividing circuit 23, a frequency divider 27 and a comparator 31. The motor control circuit 41 includes a central processing unit (CPU) 43, a digital/analog converter 45, a logic conversion circuit 47 and a motor driver 49.

The pulse dividing circuit 23 of the comparing circuit 21 is provided for enhancing a detection accuracy of the angle-of-rotation detector 15 by dividing a pulse signal by two, which is transmitted from the angle-of-rotation detector 15. A first counter 25 counts the number of output pulses of the pulse dividing circuit 23, and, for example, a 16-bit parallel signal is inputted to the comparing circuit 31. Then, the first pulse counter 25 counts up or down in accordance with a rotating direction of the angle-of-rotation detector 15. There is well known a rotary encoder which has two pairs of photocouplers with a phase difference of, e.g., 90° and detects the rotating direction from a code of the phase difference therebetween by comparing a couple of frequency waveforms given from the two photocouplers. The counter is capable of counting up in response to the output from the angle-of-rotation detector 15 when the handle is rotated in a forward direction but counting down when handle 11L, 11R is rotated in a reverse direction.

Note that the output of the angle-of-rotation detector 15 can be also inputted directly to the first pulse counter 25 by omitting the dividing circuit 23.

Rotations of the driving shaft of the DC motor 51 are transmitted to the movable member 59 via the power transmission mechanism 53. The position detector 55 detects the angle of rotation of the driving shaft of the DC motor 51, and, therefore, the number of pulses generated from the position detector 55 is extremely large as compared with a micro movement of the movable member 59 (in FIG. 11). The frequency divider 27 frequency-divides the output pulse signal of the position detector 55, and the pulse signal is inputted to the second pulse counter 29. A a frequency-division ratio thereof is set to match with a 1-pulse movement quantity by the angle-of-rotation detector 15.

It is to be noted that this second pulse counter 29 also counts up or down in accordance with the rotating direction of the rotary encoder of the position detector 55.

Then, the comparator 31 compares a count value of the first pulse counter 25 with a count value of the second pulse counter 29, and a value of difference between the two count values is transmitted as a difference signal to the CPU 43 of the motor control circuit 41. Transmitted further to the logic conversion circuit 47 of the motor control circuit 41 is a comparative signal indicating which is larger, the count value of the first pulse counter 25 or the count value of the second pulse counter 29.

This CPU 43 outputs, to the digital/analog converter 45, a digital signal of a value corresponding to the difference signal inputted from the comparator 31. The digital/analog converter 45 outputs a DC voltage signal having a voltage corresponding to a value of this digital signal to the motor driver 49 as a speed control signal. The logic conversion circuit 47 outputs a direction signal corresponding to the comparative signal given from the comparator 31 to the motor driver 49. For example, if the comparative signal indicates that the count value of the first pulse counter 25 is larger, the direction signal for rotating forward the motor 51 is outputted to the motor driver 49. When indicating that the count value of the second pulse counter 29 is larger, the direction signal for reversely rotating the motor 51 is outputted to the motor driver 49.

Note that the pulse signals from the position detector 55 are also divided by a dividing circuit 61 and are, after being counted by a pulse counter 63 constructed of a 2-bit up-down counter, inputted to the CPU 43 as position data. Based on this item of position data, the CPU 43 also checks whether or not the movable member 59 (in FIG. 1) reaches a movement limit position.

Then, the motor driver 49 inverts a polarity of a drive current applied to the motor 51 on the basis of the direction signal from the logic conversion circuit 47 and outputs the drive current having a voltage proportional to the voltage of the speed control signal transmitted from the digital/analog converter 45.

As discussed above, in accordance with this embodiment, a rotating speed of the motor 51 is controlled by the speed control signal corresponding to a difference between the rotation quantity of the rotary shaft 13 for the operation handles 11L, 11R and the rotation quantity of the DC motor 51 for moving the movable member 59, while the rotating direction of the motor 51 is controlled by the direction signal from the logic conversion circuit 47.

Accordingly, in case the operator abruptly rotates handles 11L, 11R, there is produced a large difference between a value of the output signal from the angle-of-rotation detector 15 and a value of the output signal from the position detector 55, and hence the rotating speed of the motor 51 increases. As a result, a moving speed of the movable member 59 increases following up the rotating speed of the handle.

Whereas if the operator slowly rotates the handles 11L, 11R, the value of the output signal from the angle-of-rotation detector 15 slowly changes. Since the difference between the count value of the first pulse counter 25 and the count value of the second pulse counter 29 is small, the rotating speed of the motor 51 decreases. As a result, the moving speed of the movable member 59 decreases following up the rotations of the handle.

Further, the comparing circuit 21 compares the count value of the pulse signal from the angle-of-rotation detector 15 with the count value of the pulse signal from the position detector 55 and, if the two count values are equal as a result of this comparison, outputs as a difference signal of a value "0". At this time, the motor control circuit 41 stops the rotations of the motor 51. Accordingly, the motor 51 rotates through an angle of rotation proportional exactly to the rotation quantity of the handle, and the movable member 59 is moved with a quantity corresponding to the rotation quantity of the motor 51 by the power transmission mechanism 53. That is, the angle of rotation of the handle corresponds exactly to the movement quantity of the movable member 59.

In accordance with this embodiment, the disc 16 of the rotary encoder constituting the angle-of-rotation detector 15 has 50 slits formed at intervals of equal angle about the center of rotation, and 50 pulses are outputted from the photocoupler each time the handle makes one rotation. The number of pulses is doubled by the dividing circuit 23 and, hence, the first pulse counter 25 counts 100 pulses per rotation of the handle. Accordingly, as the handle mounting portion 19 is formed with the scale formed by equally dividing 360 degrees by 100, it follows that one pulse is inputted to the comparator 31 per one-graduation rotation of the handle.

Further, the frequency-division ratio of the frequency divider 27 is set in consideration of the number of pulses from the position detector 55 and a deceleration ratio of the speed reducer included in the power transmission mechanism 53 so that the pulses outputted from the frequency divider 27 during a 1 mm-movement of the movable member 59 number 1000. With this setting, the second pulse counter 29 counts "1" with respect to the movement quantity of 1 $\mu$m of the movable member 59. Accordingly, when making one rotation of this handle, the movable member 59 is moved by 100 $\mu$m, and one graduation of the handle precisely corresponds to the movement of 1 $\mu$m of the movable member 59.

Rough and micro adjustments can be made even with one operation handle by properly switching the movement quantity of the movable member 59 with respect to the quantity of rotation of handles 11L, 11R. More specifically, (a) the dividing circuit 23 is so constructed as to make the division ratio variable, and, when a division ratio is increased by operating a switch 24, there rises a count value of the first pulse counter 25 with respect to the one-graduation rotation of handles 11L, 11R. Hence, the movement quantity of the movable member 59 can be enlarged. Alternatively, (b) the frequency divider 27 is so constructed as to make the frequency division ratio variable, and, when the frequency division ratio is increased by operating a switch 28, the count value of the second pulse counter 29 with respect to the number of rotations of the motor 51 can be decreased. Hence, the movement quantity of the movable member 59 can be enlarged. In another construction, (c) the output signal of the first pulse counter 25 or the output signal of the second pulse counter 29 is bit-shifted, whereby the output of the first pulse counter 25 may be shifted up to a higher-order than the output of the second pulse counter 29.

Figure 4:
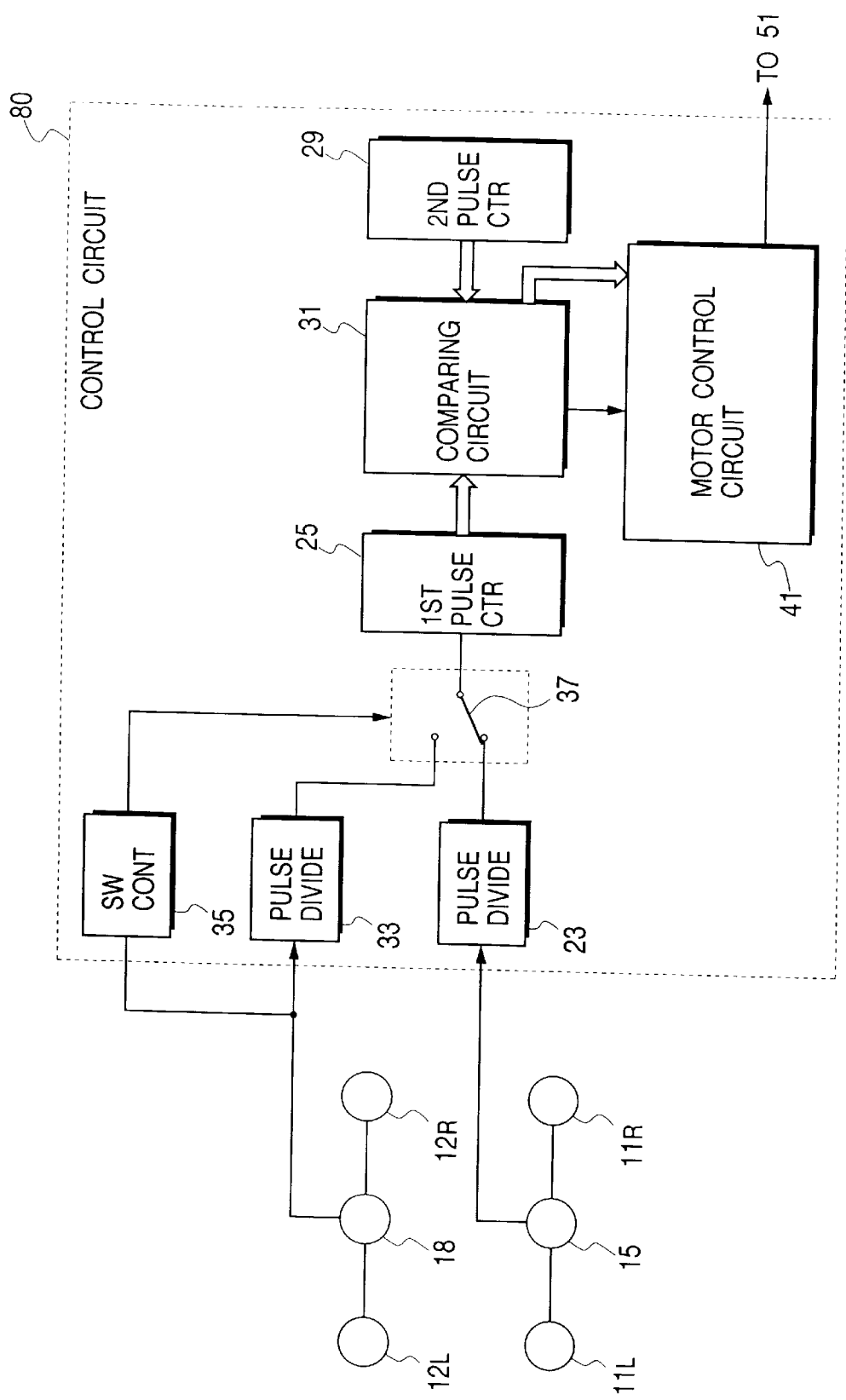
FIG. 4 is a block diagram illustrating a principal portion of the microscope in a second embodiment of the present invention.

FIG. 4 illustrates a second embodiment of the present invention, wherein second operation handles 12L, 12R are provided in addition to the operation handles 11L, 11R. A rotary shaft of this second operation handle is also provided with an angle-of-rotation detector 18 that is the same as the angle-of-rotation detector 15. A control circuit 80 includes a changeover controller 35 for detecting an output signal from the angle-of-rotation detector 18. The changeover controller 35 controls a changeover switch 37 for alternatively connecting a first-handle-side output signal and a second-handle-side output signal to the first pulse counter 25. The changeover controller 35, on detecting the output signal from the angle-of-rotation detector 18, changes over the changeover switch 37 to the second handle side, and this output signal is inputted via a dividing circuit 33 to the first pulse counter 25.

This dividing circuit 33 outputs a 50-fold number of pulses with respect to the output from the other dividing circuit 23 by increasing the pulse signals from the angle-of-rotation detector 18 by a factor of 100. With this processing, when the second handle 12L, 12R make a 1/100 rotation, the movable member 59 is moved by 0.05 mm (50 $\mu$m).

The construction may be such that two frequency dividers (not shown) are also provided on the side of the second pulse counter 29 in addition to the two dividing circuits 23, 33 provided on the side of the first pulse counter 25; and, in response to an output of the changeover controller 35 when the second handle 12L, 12R are operated, the signal from the second dividing circuit 33 is inputted to the first pulse counter 25, while at the same time the output of the second frequency divider (not shown) is inputted to the second pulse counter 29. With this construction, a ratio of the number of pulses inputted to the second pulse counter 29 to the number of pulses inputted to the first pulse counter 25 on the basis of the rotation of the second handle 12L, 12R are reduced by a factor of 10 as compared with a case of being based on the rotation of the first handle 11L, 11R. In this case, the second handle 12L, 12R are used as an operation handle for the rough movement.

Accordingly, in the case of providing the two handles in this way, the first handle 11L, 11R is usable as a handle for the micro movement. The movement quantity of the movable member 59 when rotating the second handles 12L, 12R for the rough movement with respect to the micro movement handle can be increased (several ten times as large) for the same rotational quantity.

In accordance with the first and second embodiments, a magnetic potentiometer may be used as a substitute for the rotary encoder serving as the angle-of-rotation detector 15. Further, a linear encoder for directly detecting the movement of the movable member 59 is also usable as the position detector 55 instead of providing the rotary encoder and the potentiometer on the rotary shaft of the DC motor 51.

Next, a third embodiment of the present invention will be described with reference to FIGS. 5 and 6.

An operation unit of a microscope shown in FIG. 5 includes operation handles 115 rotatably provided at two ends of a micro movement shaft 117 and rough movement operation handles 111 rotatably provided coaxially with the micro movement handles 115. A rough movement shaft 113 has small gears 114 formed at two ends thereof, engaging with gears formed along the peripheries of the handles 111 and rotating with rotations of the handles 111. A rotary encoder disc 122 is fixed to the rough movement shaft 113, thus constituting a part of a first rotation detector 121. A rotary encoder disc 126 is fixed to the micro movement shaft 117, thus constituting a part of a second rotation detector 125.

Figure 6:
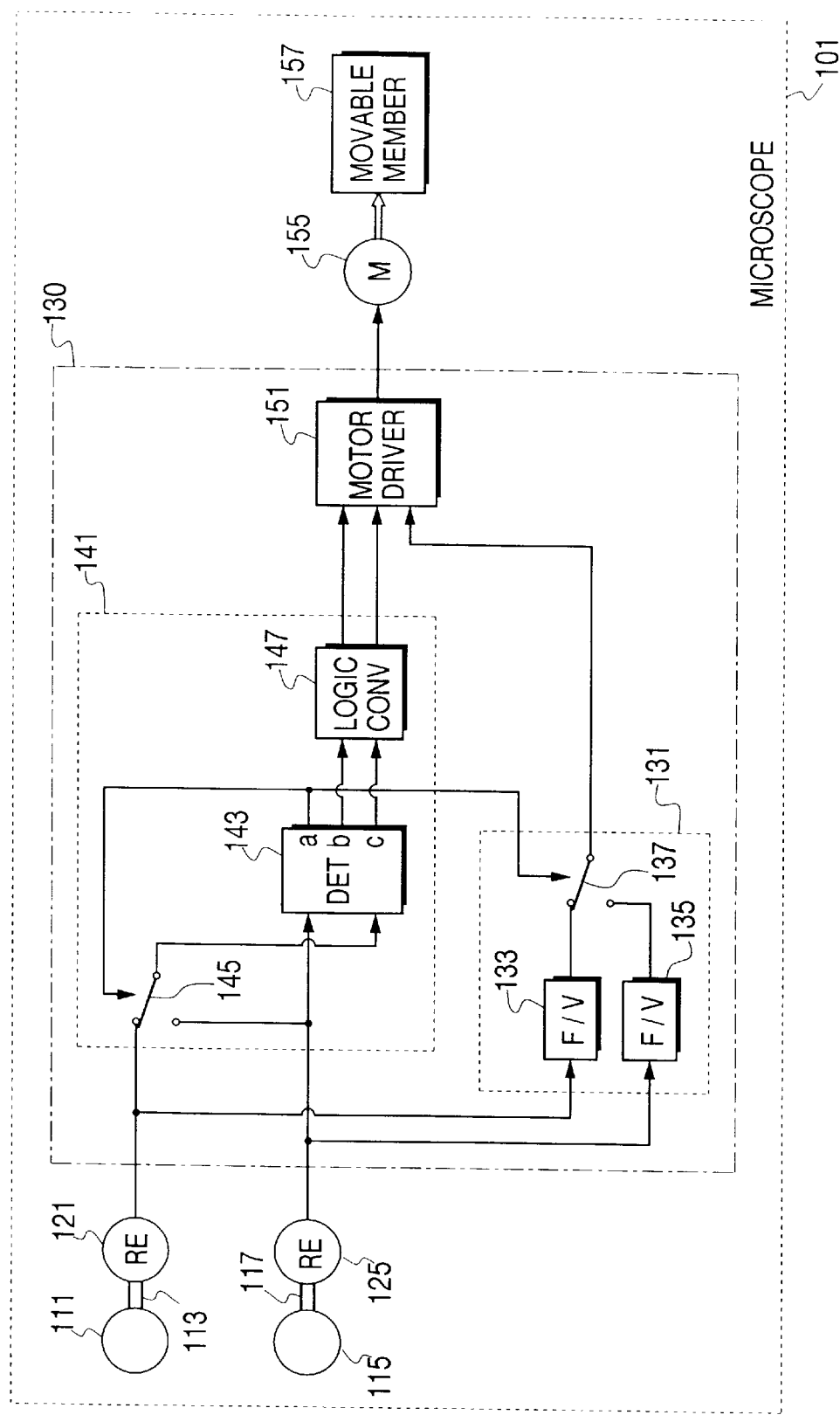
FIG. 6 is a block diagram showing a principal portion of the microscope in the third embodiment of the present invention.

FIG. 6 illustrates a configuration of a control circuit 130 incorporated into a microscope 101 in this embodiment. The control circuit 130 is constructed of a speed determining unit 31 having two frequency/voltage converting circuits 133, 135, a direction discriminating unit 141 and a motor driver 151. The direction discriminating unit 141 includes a direction detecting circuit 143 for detecting rotating directions of the shafts 113, 117 on the basis of outputs of the first and second rotation detectors 121, 125. The direction discriminating unit 141 also includes a logic conversion circuit 147 for converting direction switching signals from the direction detecting circuit 143 and outputting them to the motor driver 151.

The two frequency/voltage converting circuits 133, 135 of the speed determining unit 131 respectively convert pulse signals from the first and second rotation detectors 121, 125 into DC voltages corresponding to individual frequencies. A first changeover switch 137 alternatively outputs the output of the circuit 133 or 135 to the motor driver 151 as a speed control signal.

Note that this embodiment adopts the construction wherein the rotations of the rough movement handles 111 are accelerated and transferred to the rough movement shaft 113 by meshing with the gears, and the two frequency/voltage converting circuits 133, 135 have the same conversion factor. There may be, however, taken such a construction that the two frequency/voltage converting circuits 133, 135 have different conversion factors, or alternatively the outputs of the two frequency/voltage converting circuits are inputted to and amplified by an amplifier.

The direction discriminating unit 141 further includes a second changeover switch 145, wherein normally a first rotation signal from the first rotation detector 121 is inputted to a second input terminal of the direction detecting circuit 143, and a second rotation signal from the second rotation detector 125 is inputted to a first input terminal of the direction detecting circuit 143 as well as to a normal open terminal of the changeover switch 145.

A first output terminal a of the direction detecting circuit 143 is connected to control terminals of the changeover switches 137, 145. Second and third output terminals b and c are connected to the logic conversion circuit 147. Then, in the direction detecting circuit 143, when the signal is inputted to the first input terminal, changeover signals are outputted from the first output terminal a to the changeover switches 137, 145, respectively. When the signal is inputted to the second input terminal, direction signals are outputted from the second output terminal b or the third output terminal c, depending on a content of the input signal.

The logic conversion circuit 147 outputs, on inputting the signal from the second output terminal b of the direction detecting circuit 143, a forward rotation control signal to the motor driver 151 but outputs, on inputting the signal from the third output terminal c, a reverse rotation control signal thereto.

Accordingly, in this direction discriminating unit 141, when the first rotation signal is inputted from the first rotation detector 121 upon operating the rough movement handles 111, the first rotation signal is inputted via the changeover switch 145 to the second input terminal of the direction detecting circuit 143, the direction detecting circuit 143 outputs the signal to the second output terminal b or the third output terminal c, depending on a content of this first rotation signal. Then, a direction changeover signal from the logic conversion circuit 147 is outputted to the motor driver 151. Further, when the micro movement handles 115 are operated, the second rotation signal from the second rotation detector 125 is inputted to the first input terminal of the direction detecting circuit 143, and the direction detecting circuit 143 outputs the changeover signal to the first output terminal a to change over the changeover switch 145. Then, this second rotation signal is inputted also to the second input terminal of the direction detecting circuit 143.

Accordingly, when the micro movement handles 115 are operated, in the same way as operating the rough movement handles 111, the second rotation signal is also inputted to the direction detecting circuit 143, and the direction detecting circuit 143 outputs the signal to the second output terminal b or the third output terminal c. Then, the logic conversion circuit 147 outputs the forward or reverse rotation control signal to the motor driver 151.

Note that the output of the second frequency/voltage converting circuit 135 is given forth from the speed determining unit 131 when the micro movement handles 115 are operated by changing over the changeover switch 137 in response to the changeover signal outputted from the first output terminal a of the direction detecting circuit 143. Then, the motor driver 151 inverts a polarity of a drive signal outputted to a DC motor 155 on the basis of the forward or reverse rotation control signal and thus changes a voltage of the drive signal in accordance with a value of a speed control signal inputted from the speed determining unit 131.

Further, a power transmission mechanism of the DC motor 155 involves the use of a speed reduction gear train using worm gears, and a movable member 157 such as a stage, a lens barrel, etc. is moved up and down by a rack-and-pinion. Incidentally, a moving speed of the movable member 157 is set to 5 mm/sec at maximum during the rough movement but to 100 μm/sec at maximum during the micro movement in this embodiment.

Figure 7:
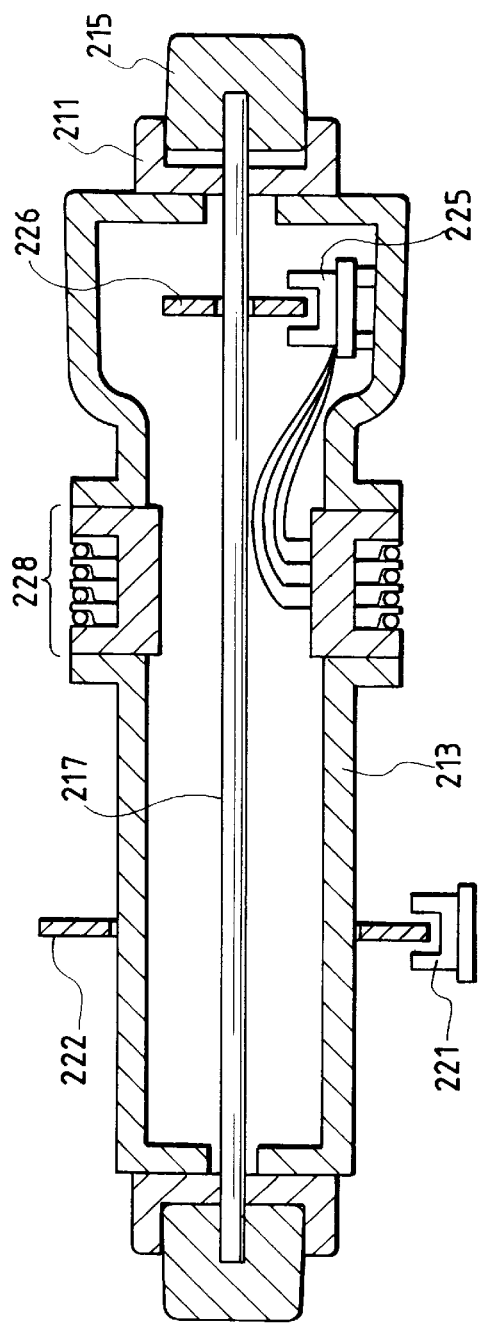
FIG. 7 is a sectional view schematically illustrating a structure of the operation handle in a modified example thereof.

The operation handle may be, as illustrated in FIG. 7, constructed such that a rough movement shaft 213 is coaxial with a micro movement shaft 217. In an example of FIG. 7, an interior of the rough movement shaft 213 provided with handles 211 at two ends thereof incorporates the micro movement shaft 217 provided with handles 215 at two ends thereof, a photocoupler 225 constituting a second rotation detector and an encoder disc 226. A second rotation signal from the second rotation detector is transmitted via a slider 228 mounted in the rough movement shaft 213 to a control circuit 130 of FIG. 6. Further, a photocoupler 221 constituting a first rotation detector and an encoder disc 222 are provided on an outer periphery of the rough movement shaft 213.

The embodiment discussed above has presented a case where the operation handles are provided at the two ends of each shaft, but only one handle may be provided at one end of each shaft. It is, however, desirable in terms of obtaining the same operability as that of a manual operating apparatus which has hitherto been accustomed to provide such a structure that the rough and micro movement shaft are coaxially constructed, pairs of operation handles are provided at the two ends of the two shafts, the two shafts penetrate the microscope body, and each pair of handles are provided on both sides of the microscope body.

Further, mechanical loads are applied to the rough and micro movement shafts, and some resistance caused by frictional forces can be thereby given to the rotations thereof. With this construction, it is possible to give the same sense as that in a conventional manual type microscope to the operator when rotationally operating the operation handles.

Next, a fourth embodiment of the present invention will be described with reference to FIGS. 8 to 11.

Figure 8:
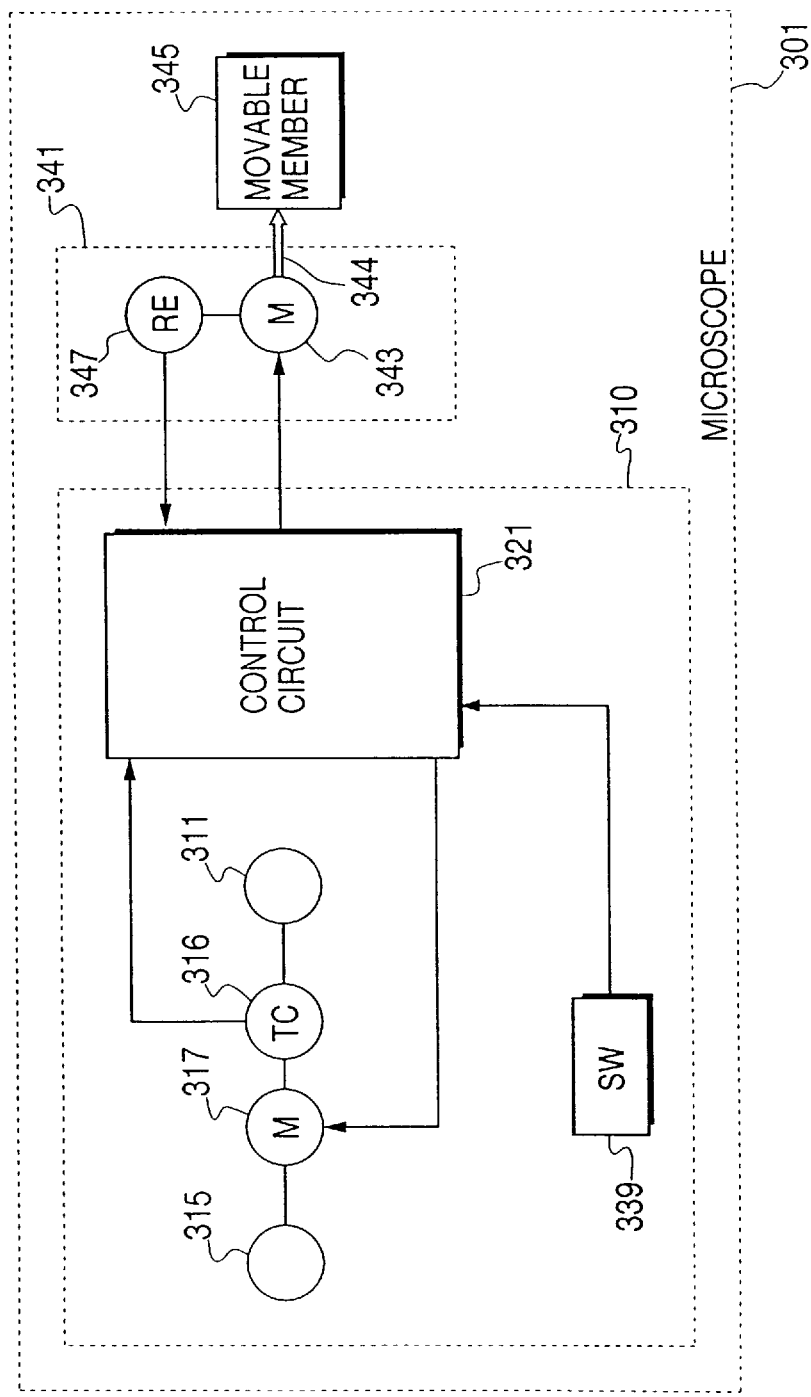
FIG. 8 is a block diagram showing a principal portion of the microscope in a fourth embodiment of the present invention.

As illustrated in FIG. 8, a moving unit 341 has a DC motor 343 for moving a movable member 345 such as a stage, a lens barrel, etc. through a power transmission mechanism 344 including a speed reduction device. The moving unit 341 also has a position detector 347 such as a rotary encoder for detecting rotations of the DC motor. An operation unit 310 includes an operation handle 311, an angle-of-rotation detector 316 and a control circuit 321 for drive-controlling the DC motor 343 under feedback control by an output from the position detector 347 as well as by an output from the angle-of-rotation detector 316.

Figure 9:
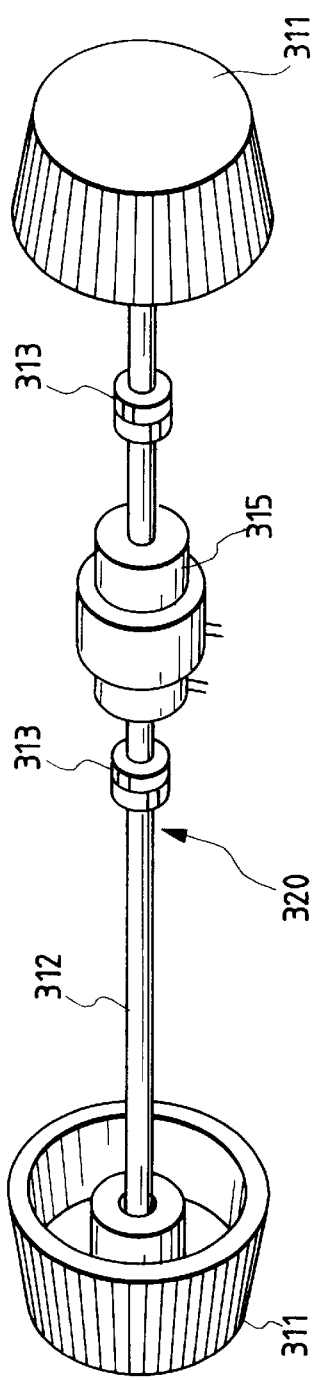
FIG. 9 is a perspective view showing a structure of the operation handle of FIG. 8.

As illustrated in FIG. 9, a rotary shaft 320 of the operation handle 311 is constructed by connecting a shaft 312 to both ends of a rotary shaft of a DC motor 315 with a tachometer generator by use of couplings 313. Operation handles 311 are provided at both ends of this rotary shaft 320. Then, in accordance with this embodiment, the tachometer generator of the DC motor 315 constitutes a angle-of-rotation detector 316.

Figure 10:
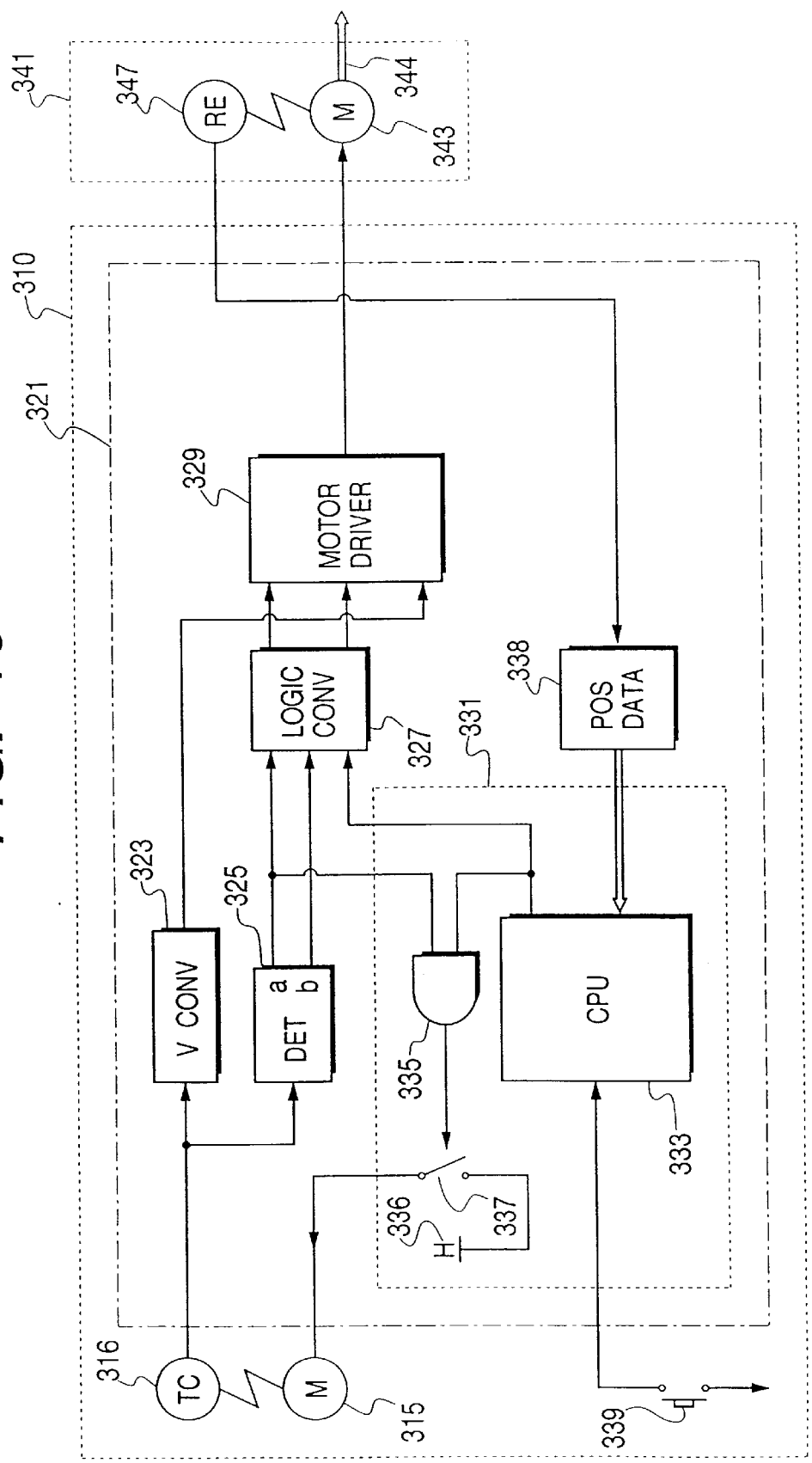
FIG. 10 is a block diagram showing a configuration of a control circuit of FIG. 8.

FIG. 10 illustrates a detailed configuration of the control circuit 321. The control circuit 321 has a voltage converting circuit 323 for inputting a signal from the angle-of-rotation detector 316 for detecting rotations of the handle shaft 312. The control circuit 321 also has a direction detecting circuit 325, a logic conversion circuit 327 for controlling the DC motor 343, a motor driver 329 and a braking control unit 331.

The voltage converting circuit 323 sets a voltage of a rotation signal from the angle-of-rotation detector 316 as a fixed-direction voltage, forms a speed control signal by properly amplifying the voltage and outputs this signal to a speed control terminal of the motor driver 329. The direction detecting circuit 325 outputs, to the logic conversion circuit 327, a direction signal for moving upward or downward the movable member 345 according to the polarity of the rotation signal. This logic conversion circuit 327 outputs the forward or reverse rotation signal to the motor driver 329 on the basis of the direction signal transmitted from the direction detecting circuit 325. The motor driver 329 outputs, to the DC motor 343, a drive signal having the polarities corresponding to the forward/reverse control signals transmitted from the logic conversion circuit 327 and a voltage corresponding to a value of the speed control signal from the voltage converting circuit 323.

An output of the position detector 347 of the moving unit 341 is inputted to a position data forming unit 338 as a movement signal. This position data forming unit 338, which involves the use of, e.g., a 20-bit pulse counter, makes this counter count up or down the number of pulses of the movement signals and inputs this count value to the braking control unit 331.

The braking control unit 331 includes a CPU 333. The CPU 333 stores the count value of the position data forming unit 338 as an item of set value data in response to an operation of a limit position setting switch 339. The DC motor 343 of the moving unit 341 is driven based on the operation of the operation handle 311, and, if the count value of the position data forming unit 338 coincides with a value of the previously stored set value, the CPU 333 outputs restriction signals to a logic conversion circuit 327 and an AND circuit 335. Then, the CPU 333 turns ON a braking switch 337 and outputs a braking signal to the DC motor 315 provided on the handle shaft 320.

It is to be noted that the logic conversion circuit 327 is formed to combine a logic given from a terminal to which the restriction signal is inputted from the CPU 333 with a logic of a terminal from which the forward rotation control signal is outputted, and the forward rotation control signal is cut off when inputting the restriction signal. Then, a connection between the motor driver 329 and the DC motor 343 and the construction of the power transmission mechanism 344 are set so that the movable member moves, e.g., upward, and a limit can be set to a rising position of the stage by this braking control unit 331.

Accordingly, with the rotations of the operation handle, when the direction detecting circuit 325 outputs the direction signal for indicating an upward movement of the movable member to the logic conversion circuit 327, this direction signal and the restriction signal from the CPU 333 are inputted to the AND circuit 335. The braking switch 337 is made conductive by an output from the AND circuit 335, and a voltage from a power supply 336 is supplied to the DC motor 315 provided on the handle shaft 320 in such a direction as to cause the reverse rotation torque of the operation handle 31.

Accordingly, in this control circuit 321, when the operation handle 311 is rotated, e.g., rightward, a voltage corresponding to a rotating speed of the handle and a polarity corresponding to a rotating direction of the handle 311 are inputted from the tachometer generator 316 to the voltage converting circuit 323 and the direction detecting circuit 325. The direction detecting circuit 325 outputs the direction signal to the logic conversion circuit 327 on the basis of the polarity of the rotation signal, while the logic conversion circuit 327 outputs, e.g., the forward rotation control signal to the motor driver 329. The voltage converting circuit 323 amplifies the voltage of the rotation signal irrespective of the polarity of the rotation signal and outputs it to the motor driver 329 as a speed control signal, while the motor driver 329 outputs the drive signal of the voltage proportional to the speed control signal to the DC motor 343.

When the movable member 345 moves in response to the thus generated drive signal, the position detector 347 and the position data forming unit 338 generate a position data signal indicating a position of the movable member 345 and inputs this signal to the braking control unit 331.

Then, when this position data signal coincides with the value of the set value data stored in the CPU 333, the logic conversion circuit 327 is inhibited from outputting the forward control signal in accordance with the restriction signal outputted from the CPU 333. Accordingly, even if the operation handle is rotated further rightward, the forward rotation control signal is not outputted from the logic conversion circuit 327, and the DC motor 343 remains stopped. If the operation handle is then rotated leftward, the logic conversion circuit 327 outputs the reverse rotation control signal, with the result that the DC motor 343 reversely rotates and the movable member 345 descends.

Further, the restriction signal from the CPU 333 is inputted also to the AND circuit 335. The AND circuit 335 makes the braking switch 337 conductive when inputting this restriction signal and the forward rotation control signal from the direction detector 325. Hence, when the operation handle 311 is further rotated in the same direction after the movable member 345 has reached to the set limit position, the braking switch is made conductive, with the result that a reverse rotation torque is produced in the DC motor 315 provided on the handle shaft 312. Accordingly, the operator is able to immediately recognize that the movable member 345 has reached the ascent limit from a sense with which a resistive force generated in the operation handle 311 is transferred to the hand.

Figure 11:
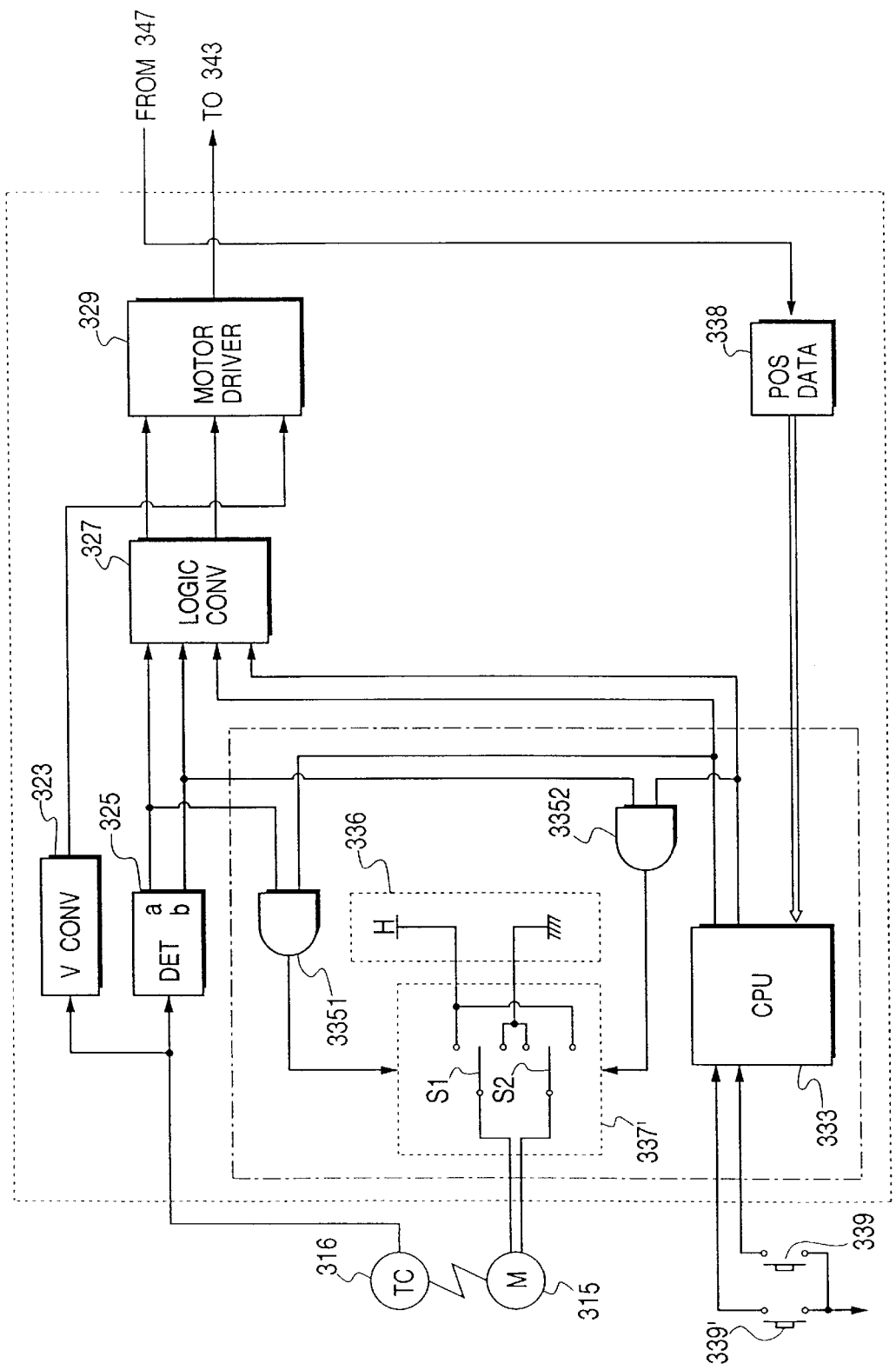
FIG. 11 is a block diagram showing a modified example of the control circuit of FIG. 8.
Figure 12:
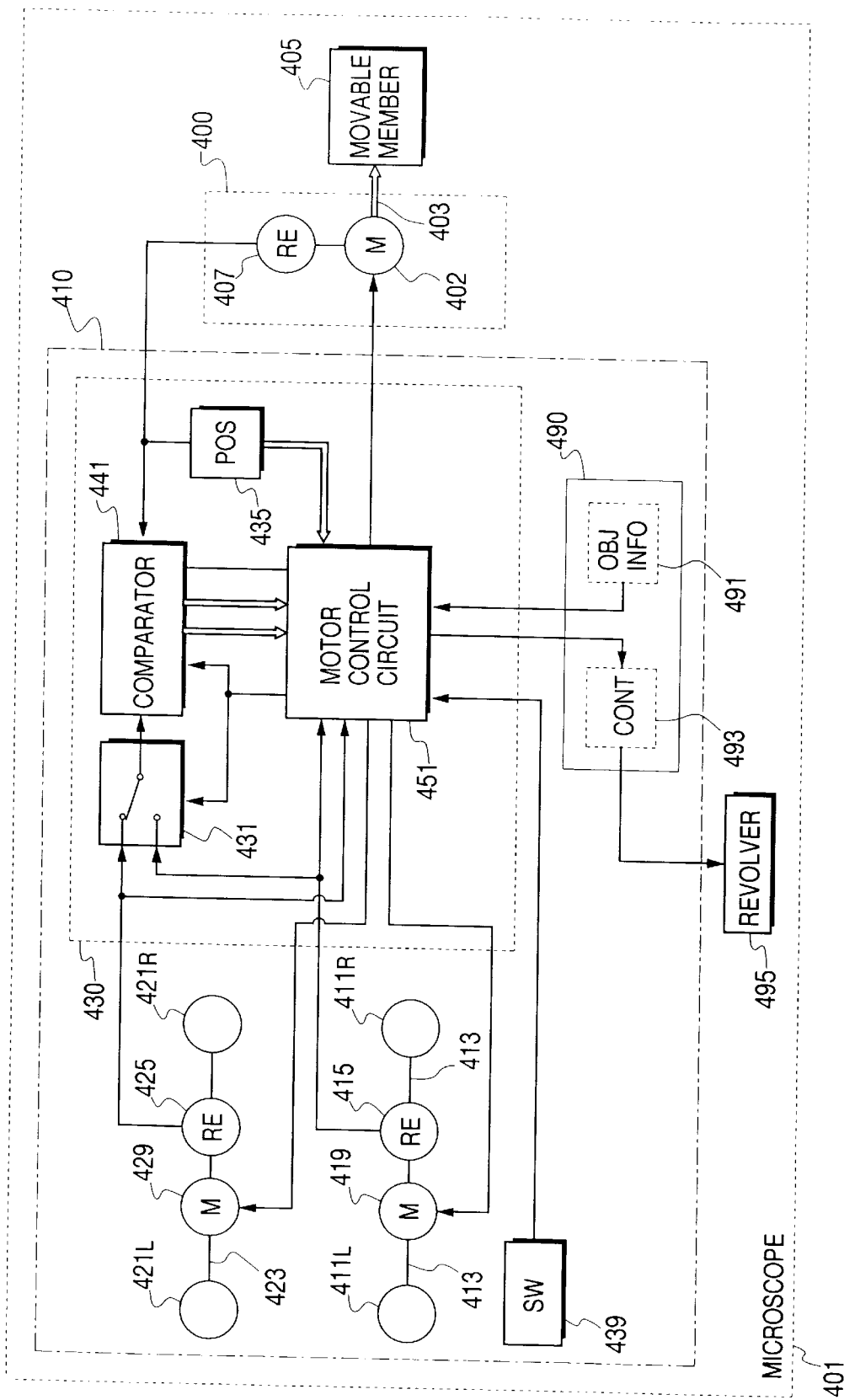
FIG. 12 is a block diagram schematically showing a construction of the microscope in a fifth embodiment of the present invention.

FIG. 11 illustrates a modified embodiment of this embodiment.

It is of importance to set the movement limit of the movable member 345 to prevent the specimen from contacting the objective lens in the microscope 301. In the illustrative modified embodiment, the construction is provided so that both upward/downward movement limits of the movable member 345 can be set. That is, a limit position setting switch 339' for setting a lower limit is provided in addition to the limit position setting switch 339 for setting the upper limit, and the CPU 333 stores two pieces of set value data and outputs two kinds of restriction signals to the logic conversion circuit 327. An AND circuit 3351, when inputting the first restriction signal and the forward rotation control signal, generates an output signal to a braking switch 337'. An AND circuit 3352, when inputting the second restriction signal and the reverse rotation control signal, generates the output signal to the braking switch 337'. The braking switch 337' having a pair of switches S1, S2 connects the switches S1, S2 respectively to the ground side and an H-level side of the power supply 336 in response to an output from the AND circuit 3351 and connects the switches S1, S2 respectively to the ground side and the H-level side response to an output from the AND circuit 3352.

Note that an electromagnetic brake or the like other than the DC motor 315 is usable as a braking device. The DC motor with the tachometer generator employed in this embodiment, however, exhibits such an advantage that the braking device and the angle-of-rotation detector can be integrally attached to the handle shaft enough to aid in the assembly of the microscope.

Next, a fifth embodiment of the present invention will be discussed with reference to FIGS. 12 to 15.

A microscope 401 is constructed of an operation unit 410, a moving unit 400 and a stage or movable member 405 including a lens barrel for supporting an objective lens. The operation unit 410 has first operation handles 411L, 411R for the micro movement, second operation handles 421L, 421R for the rough movement, a control circuit 430 and a revolver control device 490 for controlling revolutions of electrically-driven revolver 495 holding a plurality of objective lenses. Attached to a shaft 413 of the first handles 411L, 411R are first angle-of-rotation detector 415 including a rotary encoder and a first braking device 419 for applying a braking force to the shaft 413. Attached also to a shaft 423 of the second handles 421L, 421R are second angle-of-rotation detector 425 including a rotary encoder and a second braking device 429 for applying the braking force to the shaft 423.

The revolver control device 490 includes a revolver control circuit 493 for revolving the electrically-driven revolver in accordance with a drive command issued from the control circuit 430. The revolver control device 490 also includes a data input unit 491 for inputting data about types of the objective lenses disposed on an observation optical path.

The moving unit 400 moves the movable member 405 by the power of the DC motor 402 through the power transmission mechanism 403 including the speed reduction device such as the rack-and-pinion and the gears. The moving unit 400 has a rotary encoder for detecting an angle of rotation of a DC motor 404 as a detector 407 for detecting a position of the movable member 405.

The control circuit 430 controls the DC motor 402 of the moving unit 400 on the basis of inputs from the first and second angle-of-rotation detectors 415, 425.

The operation unit 410 is provided with a position setting switch 439 for setting a movement limit of the movable member 405. For example, the stage mounted with the specimen is moved with respect to the objective lens, and the objective lens is disposed upwardly of the stage. In this type of microscope, an upper limit of the movable member 405 is preset within the control circuit by operating the position setting switch 439. When the stage rises up to the upper limit position preset in accordance with the rotations of the first or second handle, the control circuit 430 stops an output of a rotational drive signal of the DC motor 402 and outputs braking signals to the first braking device 419 attached to the shaft 413 of the first handle and to the second braking device 429 attached to the shaft 423 of the second handle, thereby applying the braking force when each of handles 411L, 411R, 421L, 421R, is rotated in the rising direction of the stage.

The control circuit 430 further includes a selection switch 431 for selectively inputting, to a comparator 441, first and second rotation signals from the first and second angle-of-rotation detectors 415, 425. The comparator 441 compares the first or second rotation signal with a movement signal from the position detector 407. Further, the control circuit 430 has a motor control element 451 for controlling a rotating speed and a rotating direction of the DC motor 402 on the basis of a difference signal given from the comparator 441. The control circuit 430 also has a position data forming unit 435 for forming data representing a position of the movable member 405 on the basis of the movement signal transmitted from the position detector 407.

Figure 13:
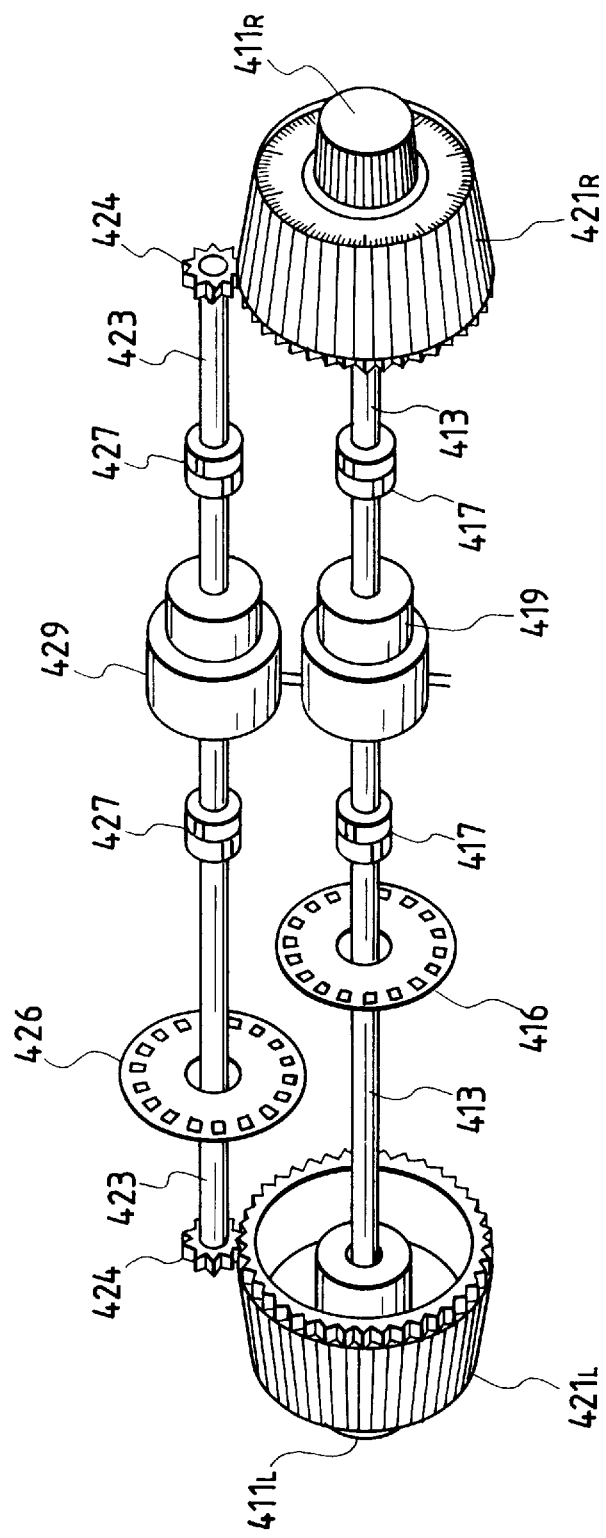
FIG. 13 is a perspective view illustrating a structure of the operation handle of FIG. 12.

FIG. 13 depicts detailed configurations of the first and second handles. The first micro movement handles 411L, 411R are fixed to both ends of the shaft 413. The second rough movement handles 421L, 421R are coaxially provided outwardly of the first handles. Gears are formed along outer peripheries of the second handles and mesh with small gears 424 provided at both ends of the shaft 423. Fixed to the shafts 413, 423 are encoder discs 416, 426 of the rotary encoders constituting the first and second angle-of-rotation detectors 415, 425.

In accordance with this embodiment, slits formed in each of the encoder discs 416, 426 number 50, but an acceleration ratio of the gear 424 is set at five times. Hence, with respect to the same angle of rotation of the rough and micro handles, the number of output pulses from the second angle-of-rotation detector 425 is five times as large as the number of output pulses from the first angle-of-rotation detector 415.

The second handles 421L 421R are provided with a scale formed by equally dividing 360 degrees by 100, and the shaft 423 is connected to both ends of the driving shaft of the DC motor constituting the braking device 429 through couplings 427. Further, the shaft 413 of the first handle 411L 411R are also connected to both ends of the drive shaft of the DC motor 419 constituting the braking device through couplings 417.

Figure 14:
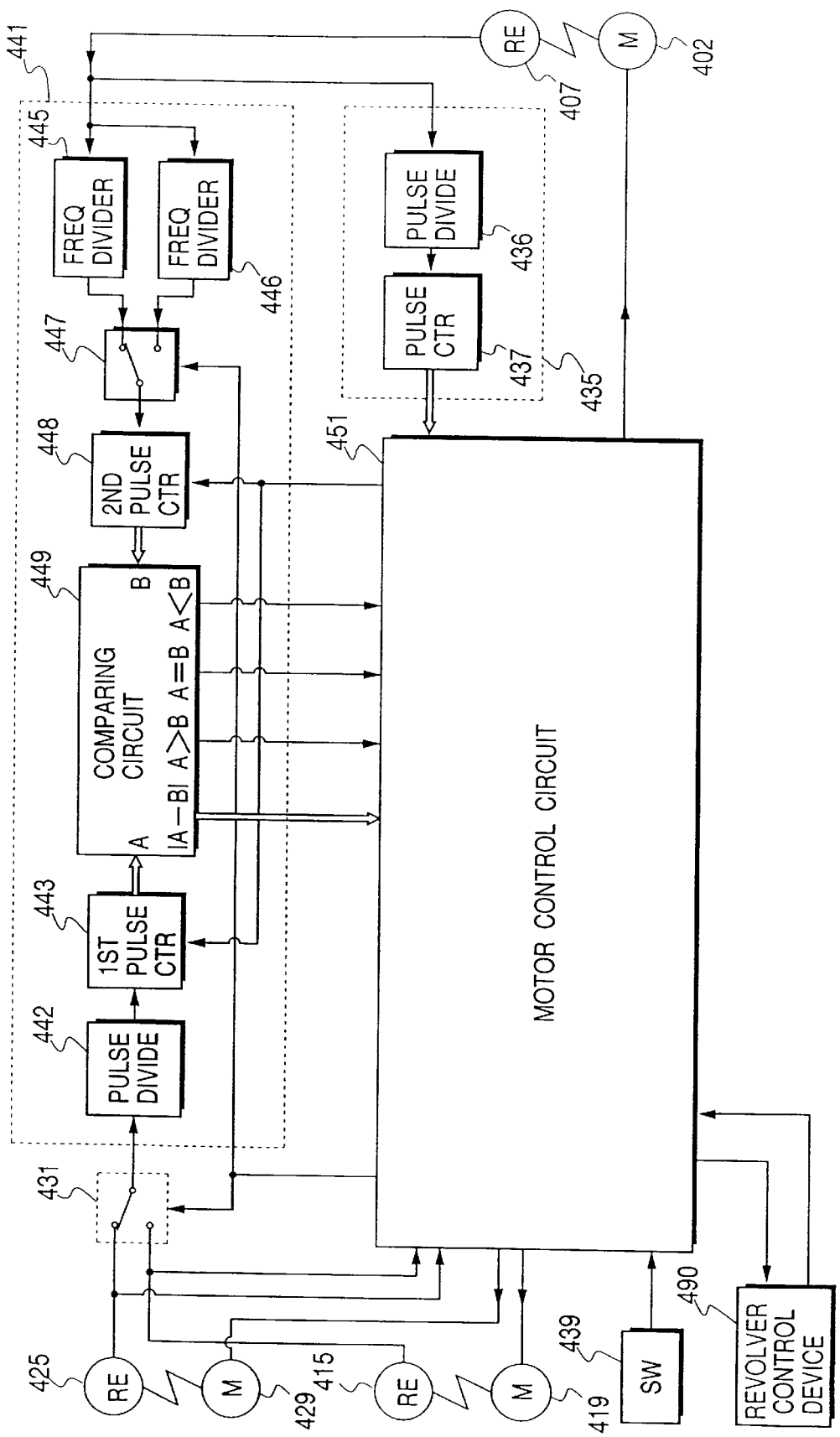
FIG. 14 is a block diagram showing a configuration of the control circuit of FIG. 12.

FIG. 14 illustrates a detailed configuration of the control circuit 430. The comparator 441 includes a dividing circuit 442 for dividing the pulse signal by 2, a comparing circuit 449, two frequency dividers 445, 446 and two 16-bit pulse counters 443, 448. Accordingly, in this embodiment, the number of slits of the encoder disc 416 is 50, and, therefore, one hundred pulses are inputted to the first pulse counter 443 each time the first handle makes one rotation. Further, one pulse is inputted to the first pulse counter 443 each time the second handle makes a 1-graduation rotation.

The frequency dividers 445, 446 inputting the movement signals from the position detector 407 have frequency division ratios different from each other. In accordance with this embodiment, the frequency division ratio of the frequency divider 445 is set 10 times the frequency division ratio of the frequency divider 446. The frequency divider 445 outputs one pulse signal for every 10 μm movement of the movable member 405, while the frequency divider 446 outputs one pulse signal for every 1 μm movement of the movable member 405. The outputs from the two frequency dividers are inputted alternatively to the second pulse counter 448 by the changeover switch 447.

The position data forming unit 435 has a pulse dividing circuit 436 for increasing the movement signals from the position detector 407 and a pulse counter 437, and a data signal representing a position of the movable member 405 is inputted to the motor control circuit 451.

Figure 15:
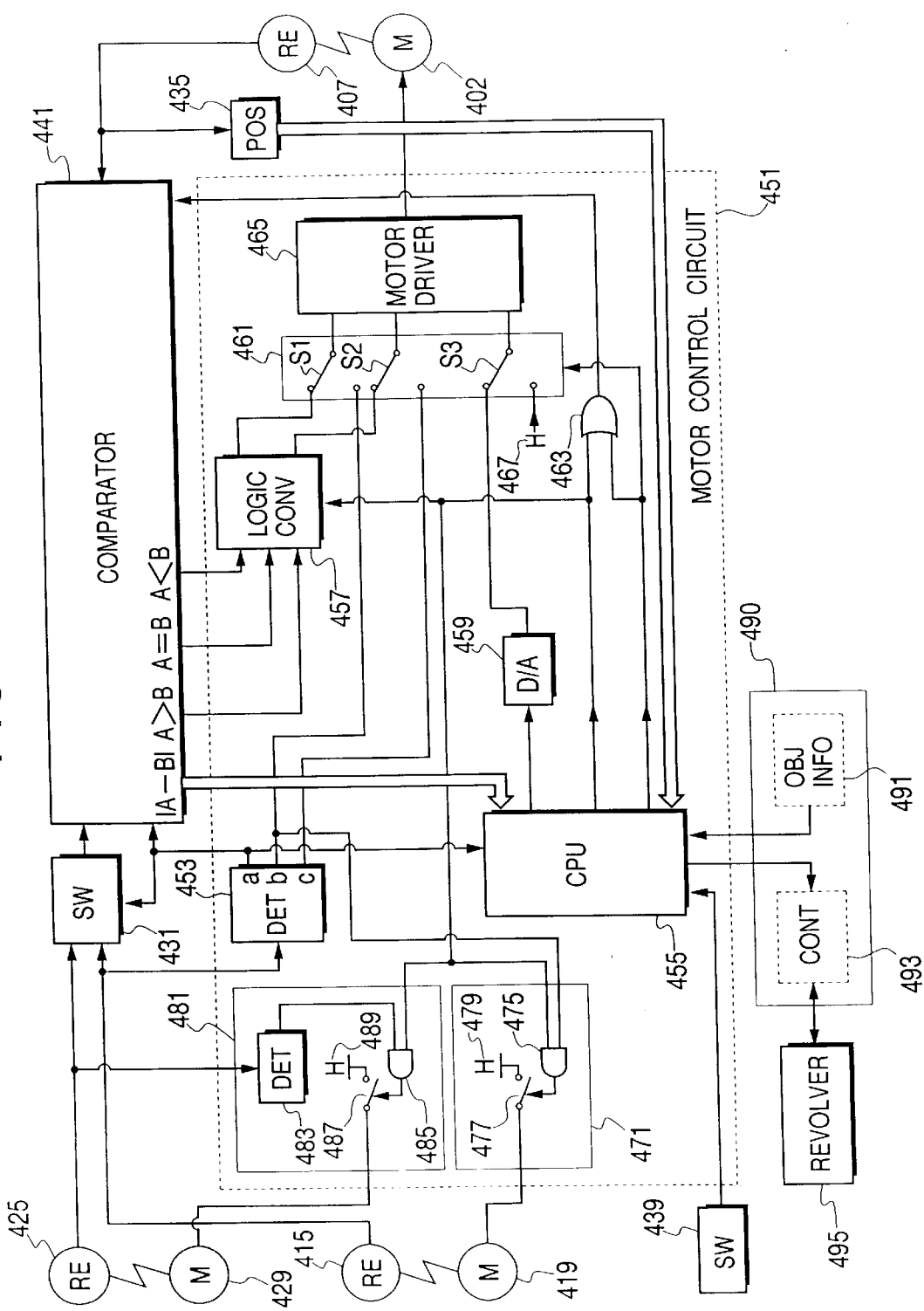
FIG. 15 is a block diagram illustrating a configuration of a motor control circuit of FIG. 12.

The comparing circuit 449 compares an output value of the first pulse counter 443 with an output value of the second pulse counter 448 and, as shown in FIG. 15, transmits a value of difference in count value between the two pulse counters as a difference signal |A−B| to a central processing unit (CPU) 455 of the motor control circuit 451. Further, the comparing circuit 449 transmits, to a logic conversion circuit 457, comparative signals A>B, A=B and A<B between the count values of the first pulse counter 443 and the count values of the second pulse counter 448.

The motor control circuit 451 includes a direction detecting circuit 453, the CPU 455, the logic conversion circuit 457, a digital-to-analog converter 459, and OR circuit 463, a motor driver 465, a first braking control circuit 471 and a second braking control circuit 481.

The direction detecting circuit 453 is connected to the first angle-of-rotation detector 415 and outputs changeover signals to the selection switch 431 and the changeover switch 447 of the comparator 441. That is, the direction detecting circuit 453, when inputting the rotation signal from the first angle-of-rotation detector 415 attached to the shaft 413 of the micro movement handles 411L, 411R, outputs the changeover signals to the changeover switch 447 of the comparator 441 and the CPU 455 from the output terminal a and also discriminates the rotating direction of the first handles 411L, 411R from a content of the rotation signal. Then, the direction detecting circuit 453 outputs, when the handles 411L, 411R are rotated forward, the direction signal from the output terminal b, but outputs, when rotated reversely, the direction signal from the output terminal c. The direction signals from those output terminals b and c are inputted to a switch device 461.

The CPU 455 inputs the difference signal from the comparator 441 and a data signal, etc. from the position data forming unit 435 and outputs a speed signal of a value corresponding to the value of the difference signal from the comparing circuit 449.

The logic conversion circuit 457 inputs the comparative signals from the comparing circuit 449 and outputs a direction changeover signal, i.e., a forward or reverse rotation control signal to the motor driver 465 via the switch device 461.

The digital-to-analog converter 459 converts the speed signal of the digital signal outputted by the CPU 455 into a voltage signal and transmits it to the motor driver 465 via the switch device 461. The motor driver 465 outputs a drive signal of a voltage proportional to the voltage of the speed signal to the DC motor 402. This drive signal has a voltage of a polarity corresponding to the forward or reverse control signal from the logic conversion circuit 457.

The OR circuit 463 functions as a counter control circuit. The motor driver 465 outputs the drive signal to the DC motor 402. The first braking control circuit 471 outputs a braking signal to the first braking device (DC motor 419) of the first handles 411L, 411R. The second braking control circuit 481 outputs the braking signal to the second braking device (DC motor 429) of the second handles 421L, 421R.

Accordingly, in this control circuit 430, when the second handles 421L, 421R are operated, the second rotation signal from the second angle-of-rotation detector 425 is inputted to the first pulse counter 443 via the selection switch 431 and the dividing circuit 442. The first pulse counter 443 is capable of counting up or down the number of pulses of the second rotation signals in accordance with the rotating direction of the shaft 423 that is detected by the second angle-of-rotation detector 425 and transmitting it to the comparing circuit 449.

The comparing circuit 449 compares a count value of the first pulse counter 443 with a count value of the second pulse counter 448. The comparing circuit 449 outputs, if the count value of the first pulse counter 443 is larger, the first comparative signal A>B to the logic conversion circuit 457 but outputs, whereas if the count value of the second pulse counter 448 is larger, the second comparative signal A<B to the logic conversion circuit 457. Then, the comparing circuit 449 outputs, to the CPU 455, the difference signal |A−B| indicating a value of difference in count value between the first and second pulse counters 443, 448.

The logic conversion circuit 457, when inputting the first comparative signal A>B, outputs a forward rotation control signal, and when inputting the second comparative signal A<B, outputs a reverse rotation control signal, to the motor driver 465 through the switch device 461. However, the logic conversion circuit 457 is so constituted not to output the forward rotation control signal when a limit signal described hereinafter is inputted thereto.

Further, the CPU 455 outputs the speed signal of the digital signal based on the difference signal |A−B| from the comparing circuit 449. This speed signal is converted into a speed signal of a voltage corresponding to the value of the difference signal by the digital-to-analog converter 459 and inputted to a speed control terminal of the motor driver 465 via the switch device 461. Therefore, the motor driver 465 outputs the drive signal for causing the forward rotations of the DC motor 402. A voltage of this drive signal corresponds to the voltage corresponding to the value of the difference signal |A−B| from the comparing circuit 449.

When, for example, the rough movement handles 421L, 421R are thereby rotated forward, the first comparative signal A>B and the difference signal |A−B| are generated from the comparing circuit 449, and, simultaneously, the forward rotation control signal is generated from the logic conversion circuit 457. Inputted to the motor driver 465 are this forward rotation control signal and the speed signal from the D/A converter 459 based on the difference signal. The motor driver 465 outputs the drive signal for causing the forward rotations of the DC motor 402. When the rough movement handle 421 is quickly operated, and, because of the difference signal value being larger, the drive signal of the larger voltage is applied to the DC motor 402, with the result that the motor 402 rotates fast.

With the movement of the movable member 405 that is based on the rotations of this motor 402, if the count value of the second pulse counter 448 coincides with the count value of the first pulse counter 443, the value of the difference signal from the comparing circuit 449 becomes 0. Then, the outputting of the first comparative signal A>B is stopped, and the motor driver 465 stops outputting the drive signal.

With the reverse rotations of the rough movement handles 421L, 421R, the movable member 405 can be moved in the reverse direction by the same operation.

When the micro movement handles 411L, 411R are operated, the direction detecting circuit 453 inputs the rotation signal from the first angle-of-rotation detector 415 and outputs the changeover signal from the first output terminal a. At this time, the direction detecting circuit 453 discriminates the rotating direction of the shaft 413 of the handles 411L, 411R. The direction detecting circuit 453 outputs, when the shaft rotates forward, the direction signal from the second output terminal b but outputs, when it rotates reversely, the direction signal from the third output terminal c.

Accordingly, the handles 411L, 411R are operated, and, when the first angle-of-rotation detector 415 outputs the first rotation signal, the selection switch 431 and the changeover switch 447 are changed over by the changeover signals. Then, the first rotation signal is inputted via the selection switch 431 to the first pulse counter 443, and the movement signal frequency-divided by the second frequency divider 446 is inputted to the second pulse counter 448.

Subsequently, the comparing circuit 449 compares the count value of the first pulse counter 443 with the count value of the second pulse counter 448, and in the same way as the above-mentioned, the CPU 455, the logic conversion circuit 457 and the motor driver 465 cooperate to control the rotations of the DC motor 402, thus moving the movable member 405.

Incidentally, when the micro movement handles 411L 411R are operated, as illustrated in FIG. 13, there is outputted the number of pulses that is one-fifth the same rotational quantity of the rough movement handles 411L, 411R. Also, the frequency division ratio of the second frequency divider 446 is set to one-tenth the frequency division ratio of the first frequency divider 445. Hence, on the occasion of rotating the handles 411L, 411R, for the micro movement of the movable member, the count value of the first pulse counter 443 is equalized to the count value of the second pulse counter 448, and the handles 411L, 411R have a 50-fold control accuracy as compared with the handles 421L 421R. In accordance with this embodiment, for example the movable member moves 0.1 mm with one rotation of the handle 411L and moves 5 mm with one rotation of the handle 421L.

The position data forming unit 435, as illustrated in FIG. 14, doubles the number of pulses of the movement signals from the position detector 407 by use of the dividing circuit 436. The position data forming unit 435 then accurately detects a position of the movable member from counting by the 20-bit pulse counter 437, thereby generating a position data signal. This position data signal is transmitted to the CPU 455. The CPU 455 stores in memory a value of the position data signal when the position setting switch 439 is operated and, when this stored value is equal to the value of the position data signal given from the position data forming unit 435, outputs the limit signals to the counter control circuit 463, the logic conversion circuit 457, the first braking control circuit 481 and the second braking control circuit 471.

Then, when the limit signal is inputted from the CPU 455, the logic conversion circuit 457 stops outputting the forward rotation control signal, whereby the movable member 405 stops.

Further, the second braking control circuit 481 has an AND circuit 485, a braking switch 487, a direction detecting circuit 483 and a power supply 489. The direction detecting circuit 483 detects a rotating direction of the handles 421L, 421R and, when the handles 421L, 421R are rotationally operated in such a direction as to move the movable member, e.g., upward, outputs an upward signal. When the limit signal is inputted to the second braking control circuit 481, this upward signal and the limit signal are inputted to the AND circuit 485, and the braking switch 487 is made conductive. Then, a voltage from the power supply 489 is applied to the DC motor constituting the second braking device. As a result, a rotational torque acting in a direction opposite to the operating direction is given to the handle. Accordingly, when the movable member 405 reaches the movement limit, the DC motor 402 stops, and, besides, it is possible to immediately make the operator understand this state through the braking force applied to the handle.

Note that when the rough movement handles 421L, 421R are reversely rotated in the limit position, no braking control signal is outputted from the AND circuit 485, and hence the movable member 405 can be moved in the reverse direction.

Further, the first braking control circuit 471 also has an AND circuit 475 and a braking switch 477. When the limit signal and the signal from the output terminal b of the direction detecting circuit 453 are inputted to the AND circuit 475, a voltage of a power supply is applied to the DC motor 419 constituting the first braking element. Accordingly, when the movable member 405 comes to the movement limit, the braking force is applied to the rotation of the micro movement handles 411L, 411R.

Further, in accordance with this embodiment, there is provided the revolver control device 490 for electrically driving and revolving the revolver 495 supporting the plurality of objective lenses. The objective lens data input unit 491 transmits the operation signal to the revolver control circuit 493 via the CPU 455 and, when a high-magnification objective lens is selected, outputs a high-magnification signal to the CPU 455. The CPU 455, upon inputting the changeover signal from the direction detecting circuit 453, outputs a micro movement control signal. This micro movement control signal is inputted to the OR circuit 463 and the control terminal of the switch device 461. The switch device 461, upon inputting the micro movement control signal, changes over the connections of the first and second switch terminals S1, S2 to the second and third output terminals b and c from the output terminals of the logic conversion circuit 457 and also changes over the connection of the third switch terminal S3 to the power supply 467 from the D/A converter 459.

Accordingly, it follows that the switch device 461 outputs the direction signal from the direction detecting circuit 453 and a fixed voltage of the power supply 67 to the motor driver 465 in response to the micro movement control signal. As a result, the high-magnification objective lens is to be selected, and, when the micro movement handles 411L 411R are operated, the motor 402 is rotated by the fixed voltage at an extremely slow speed, and the movable member 405 moves upward or downward at an extremely slow velocity in accordance with the rotations of the handles 411L.

It is to be noted that at this time micro movement control signal passing through the OR circuit 463 enters the comparator 441 to stop the counting by the first and second pulse counters 443, 448. Accordingly, even if the signals from the angle-of-rotation detector 415 and the position detector 407 are inputted to the comparator 441 due to the rotations of the handle 411 and the movement of the movable member, the comparing circuit 449 is not operated at all.

Further, the limit signal is inputted also to this OR circuit 463, and, when the movable member 405 reaches the movement limit, the counting by the first and second pulse counters 443, 448 is stopped even if the handles 411L, 411R, 421L and 421R are further rotated in such a direction as to exceed the limit.

Thus, in accordance with this embodiment, the movable member 405 is largely moved according to the rotational quantity of the rough movement handles 421L, 421R and can be also moved slightly up and down in accordance with the rotational quantity of the micro movement handles 411L, 411R. Also, when using the high-magnification objective lens, the movable member can be moved up and down at the extremely slow velocity in accordance with the rotating direction of the micro movement handles 411L, 411R irrespective of the rotational quantity of the micro movement handle 411.

Incidentally, the construction may be such that the revolutions of the revolver 495 respond to an operation of a manual switch, and, when the high-magnification objective lens is selected, the high-magnification signal is inputted to the motor control circuit 451.

In this embodiment, during an inspection by the microscope employing the high-magnification objective lens, a fine adjustment is carried out irrespective of a resolution of the first angle-of-rotation detector 415. Therefore, when using the microscope in this embodiment, the micro movement adjustment is finely performed in accordance with the rotational quantity of the micro movement handles 411L, 411R during a normal inspection, and a quick rough movement adjustment can be done in accordance with the rotational quantity of the rough movement handles 421L, 421R. During the inspection entailing the use of the high-magnification objective lens, the stage or the lens barrel is slowly moved at a fixed velocity, thus making it possible to perform accurate focusing.

Further, according to this embodiment, there are provided the two operation handles for the micro and rough movements, and the angle-of-rotation detectors are prepared for those handles, respectively. The construction may be, however, such that the single operation handle serves for both the micro movement and for the rough movement. In this case, the rotary shaft of the dual-purpose operation handle is provided with the braking device and the angle-of-rotation detector, and a speed selection switch is disposed in an adequate position of the microscope. Then, a division ratio of the dividing circuit is changed over in response to the operation of the speed selection switch, and the number of pulses of the rotation signals from the angle-of-rotation detector may be changed. Alternatively, there may be changed over a ratio of the number of pulses of the rotation signals from the angle-of-rotation detector to the number of pulses of the movement signals from the position detector in response to the operation of the speed selection switch.

Each of the above-discussed embodiments of the present invention has dealt with the moving apparatus applied to the movable member such as, e.g., the stage and the lens barrel moving in the perpendicular direction as in the focusing operation. The moving apparatus according to the present invention is, however, applicable to a case where the stage is moved in the horizontal direction in order to adjust an observing position for, e.g., the specimen on the stage.

What is claimed is:

1. A microscope comprising:
   a movable member;
   a motor;
   a power transmission mechanism provided between said movable member and said motor;
   a position detector which generates an output indicating a position of said movable member;
   a rotatable operation handle;
   a rotation detector which generates an output corresponding to a rotational quantity of said operation handle; and
   a control circuit, having a comparator for outputting a difference signal of a difference between the output of said rotation detector and the output of said position detector, which controls rotation of said motor based on the difference signal from said comparator.

2. The microscope according to claim 1, wherein said position detector has a rotary encoder equipped with an encoder disc rotating with rotations of said motor, and
   said rotation detector has a rotary encoder equipped with an encoder disc rotating with the rotations of the operation handle.

3. The microscope according to claim 2, wherein said operation handle is formed with graduations at equal intervals about an axis of a rotary shaft thereof.

4. The microscope according to claim 1, wherein an output of said rotation detector and an output of said position detector are respectively pulse signals,
   said control circuit further has a first pulse counter for counting pulses from said rotation detector and a second pulse counter for counting pulses from said position detector, and
   said comparator compares a count value of said first counter with a count value of said second counter to generate said difference signal.

5. The microscope according to claim 4, wherein said control circuit further has:
- a dividing circuit provided between said rotation detector and said first pulse counter and having a predetermined division ratio for increasing the number of pulses from said rotation detector; and
- a switch for changing the division ratio of said dividing circuit.

6. The microscope according to claim 4, wherein said control circuit further has:
- a frequency divider provided between said position detector and said second pulse counter and having a predetermined frequency division ratio for decreasing number of pulses from said position detector; and
- a switch for changing the frequency division ratio of said frequency divider.

7. A microscope comprising:
- a movable member;
- a motor;
- a power transmission mechanism provided between said movable member and said motor;
- a position detector which generates an output indicating a position of said movable member;
- first and second rotatable operation handles;
- a first rotation detector which generates an output corresponding to a rotational quantity of said first operation handle;
- a second rotation detector which generates an output corresponding to a rotational quantity of said second operation handle;
- a changeover switch which selects one of the output of said first rotation detector and the output of said second rotation detector; and
- a control circuit, having a comparator for outputting a difference signal of a difference between the output from said one rotation detector that is selected by said changeover switch and the output of said position detector, which controls rotation of said motor based on the difference signal from said comparator.

8. The microscope according to claim 7, wherein each of said first and second operation handles is equipped with a rotary shaft, and said control circuit has first and second rotation detectors which generate outputs corresponding to rotational quantities of said first and second operation handles.

9. The microscope according to claim 7, wherein said first operation handle is coaxial with said second operation handle.

10. The microscope according to claim 7, wherein:
- said first and second rotation detectors respectively detect rotating speeds and rotating directions of rotary shafts of said first and second operation handles; and
- said control circuit includes a drive control circuit which controls said motor based on a speed control signal corresponding to the detected rotating speed of each of said handles and a direction changeover signal indicating the detected rotating direction of each of said handles.

11. A microscope comprising:
- a movable member;
- a motor;
- a power transmission mechanism provided between said movable member and said motor;
- a position detector which generates an output indicating a position of said movable member;
- a rotatable operation handle;
- a rotation detector which generates an output corresponding to a rotational quantity of said operation handle;
- a movement limit setting switch which permits a user to set a movement limit position of said movable member;
- a braking device provided on a rotary shaft of said operation handle; and
- a control circuit, including a memory to store said movement limit position, which drives said motor based on an output of said rotation detector and operates said braking device when a present position of said movable member, determined from an output of said position detector, reaches the movement limit position stored in said memory.

12. The microscope according to claim 11, wherein, in response to operation of said movement limit setting switch, a signal from said position detector is stored as said movement limit position in said memory.

13. The microscopic according to claim 11, wherein said braking device has a motor with a tachometer generator.

* * * * *